W. H. HENSCHEN.
METALLIC SPRING TIRE.
APPLICATION FILED DEC. 13, 1915.
1,210,647.
Patented Jan. 2, 1917.
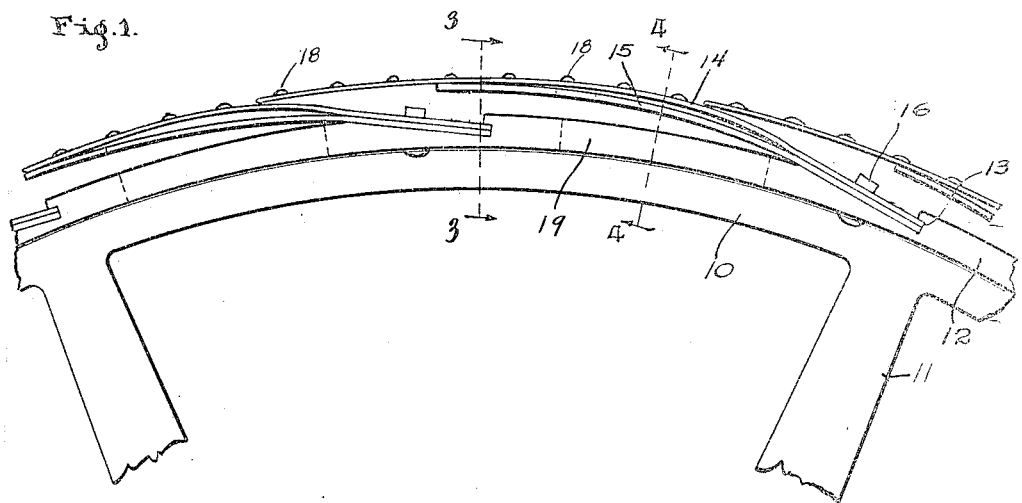
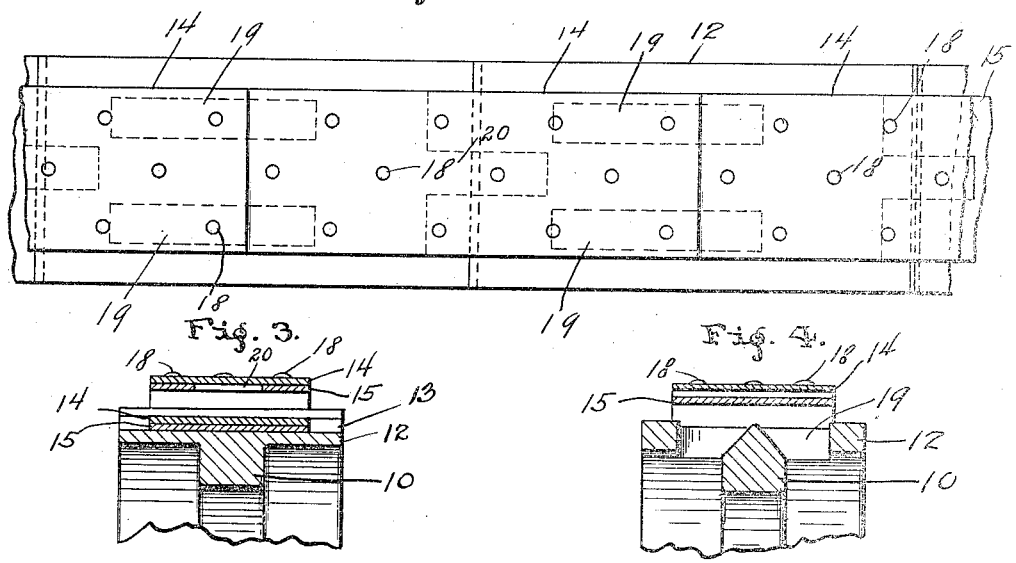
WITNESSES:
INVENTOR
William H. Henschen
BY
Lockwood & Lockwood
ATTORNEYS

UNITED STATES PATENT OFFICE.

WILLIAM H. HENSCHEN, OF INDIANAPOLIS, INDIANA, ASSIGNOR OF ONE-HALF TO JOHN P. COLLINS, OF CHICAGO, ILLINOIS.

METALLIC SPRING-TIRE.

1,210,647.  Specification of Letters Patent.  Patented Jan. 2, 1917.

Application filed December 13, 1915. Serial No. 66,589.

*To all whom it may concern:*

Be it known that I, WILLIAM H. HENSCHEN, a citizen of the United States, and a resident of Indianapolis, county of Marion, and State of Indiana, have invented a certain new and useful Metallic Spring-Tire; and I do hereby declare that the following is a full, clear, and exact description thereof, reference being had to the accompanying drawings, in which like letters refer to like parts.

The object of this invention is to provide a wheel with a spring tire whereby it will be resilient so as to have the advantages of the ordinary pneumatic or rubber tire and avoid the disadvantages found therein.

The main feature of the invention consists in providing a series of springs overlapping each other, having one end of each spring secured to the rim of the wheel and the other end frictionally engaging the next spring so as to be movable thereon and maintain its resiliency. As shown in the accompanying drawings, there may be a second spring secured with the above-mentioned spring to the rim and extending beneath the first-mentioned spring and pressing outwardly against it so as to strengthen its tension toward the center.

Another feature of the invention consists in providing suitable traction for the wheel, namely in a plurality of small outwardly extending projections on the outer surface of the springs.

A further feature of the invention consists in providing openings in the rim just inward of each spring in order that dirt or gravel and the like may be forced through the rim when the springs are actuated so as to prevent their choking, thereby stopping the desired movement of the springs. There are also slots provided in the ends of the inner springs for serving a like purpose.

The full nature of the invention will be understood from the accompanying drawings and the following description and claim.

In the drawings, Figure 1 is a side elevation of a portion of a vehicle wheel. Fig. 2 is a plan view looking down thereon. Fig. 3 is a cross section on the line 3—3 of Fig. 1. Fig. 4 is a cross section on the line 4—4 of Fig. 1.

In the drawings there is shown a wheel rim 10 having spokes 11 and an extended band portion 12 integral therewith. Said band portion is provided with recesses 13 in which are secured the outer springs 14 and inner springs 15 by means of bolts 16. Said springs are secured together at their fixed ends by said bolts and are securely held in the recess 13. The springs 14 are so arranged that their other ends overlap the following spring so as to rest thereon and be held thereto by their inwardly exerted tension. The springs 15, secured by the same means as the springs 14 to the rim, extend beneath the springs 14 and engage the inner surface thereof near their centers or their weakest points and exert an outward pressure against the springs 14 so as to relieve the strain thereon and reinforce them.

On the outer surface of the springs 14 there are projections 18 which are adapted to improve the traction of said wheel and consist of rounded projections secured thereon.

There are openings 19 in the rim spaced at intervals provided for the removal of dirt and gravel from beneath the springs so that they will not become choked thereby and prevent their flexible movement. If any dirt or gravel becomes lodged between or under the springs, it will be dislodged and forced automatically through the openings 19 by the pressure of the springs. Said openings are provided to allow any dirt to be forced therethrough instead of against the rim where it would become clogged and prevent the desired movement of the springs.

While two series of springs are shown, the invention is not limited to two series necessarily, as for some purposes there may be more or less than two series.

There are slots 20 in the free ends of the springs 15 provided for the same purpose as the openings 19, namely, to prevent the springs from becoming clogged with dirt or the like.

The invention claimed is:

A wheel rim, a series of overlapping springs secured to said rim and having one end of each spring engaging and resting on the adjacent spring, a second series of springs each secured at one end to said rim and having the other ends engaging the inner surfaces of said first mentioned springs, and means on said second mentioned springs for allowing dirt and the like to be removed from between said springs.

In witness whereof, I have hereunto affixed my signature.

WILLIAM H. HENSCHEN.